United States Patent
Cerny

[11] Patent Number: 5,857,267
[45] Date of Patent: Jan. 12, 1999

[54] DRIVE ASSEMBLY WITH INTERFERENCE-FIT MOUNTED LIGHTWEIGHT NON-FERROUS PULLEY

[75] Inventor: Zdenek Cerny, Brampton, Canada

[73] Assignee: Tesma International Inc., Concord, Canada

[21] Appl. No.: 732,120

[22] Filed: Oct. 15, 1996

Related U.S. Application Data

[62] Division of Ser. No. 523,598, Sep. 5, 1995, Pat. No. 5,626,532.

[51] Int. Cl.⁶ .................................................. F16H 55/36
[52] U.S. Cl. ........................................................ 29/892.11
[58] Field of Search .................... 29/892, 892.1, 29/892.11, 512; 474/168, 902, 903

[56] References Cited

U.S. PATENT DOCUMENTS

| | | | |
|---|---|---|---|
| 2,290,619 | 7/1942 | Rieger | 29/512 X |
| 2,755,675 | 7/1956 | Abel | 474/168 X |
| 2,827,225 | 3/1958 | Killian | 29/892.11 X |
| 3,105,709 | 10/1963 | Hanke | 29/892.11 X |
| 3,134,376 | 5/1964 | Rice | 29/892.1 X |
| 3,562,888 | 2/1971 | Settle | 29/892.11 |
| 4,824,422 | 4/1989 | Jocic | 29/892 X |
| 5,575,728 | 11/1996 | Cerny | 474/170 |

*Primary Examiner*—Joseph M. Gorski
*Attorney, Agent, or Firm*—Pillsbury Madison & Sutro LLP

[57] ABSTRACT

A drive assembly for rotating a shaft of a pulley-driven device is disclosed together with a method of making the drive assembly. The method comprises the steps of forming a pulley of lightweight non-ferrous metal having a web portion, forming a radially inward portion of the web portion into an axially extending annular portion, mounting a connecting ring of ferrous metal having an annular groove in an interior end surface thereof over the axially extending portion of the web portion so that a free end of the axially extending portion extends adjacent the annular groove, cold-forming the free end to fill the annular groove, welding a hub of ferrous material to the connecting ring and machining a central axial bore through the web portion and the axially extending portion thereof and the hub.

2 Claims, 2 Drawing Sheets

DRIVE ASSEMBLY WITH INTERFERENCE-FIT MOUNTED LIGHTWEIGHT NON-FERROUS PULLEY

This is a division of application Ser. No. 08/523,598, filed Sep. 5, 1995 and now U.S. Pat. No. 5,626,532.

RELATED APPLICATIONS

The present application is an improvement on my application Ser. No. 08/412,306, filed Mar. 29, 1995, and now U.S. Pat. No. 5,576,728 for a Drive Assembly with Interference-Fit Mounted Pulley.

BACKGROUND OF THE INVENTION

In the aforesaid application, there is disclosed a drive assembly for rotating a shaft of a belt driven device. The drive assembly includes a hub in the form of an annular body of ferrous metal having a groove in an external periphery thereof. A belt driven pulley is provided in the form of ferrous sheet metal and includes a web portion. A structural connection is defined between the hub and the pulley web portion such that the hub is fixed in abutted relation with the pulley web portion. The hub and the pulley web portion have a bore therethrough defining a single, machined annular surface. The annular surface is constructed and arranged to engage a periphery of the shaft in an interference-fitted manner so as to maintain torque transfer to the shaft in the event of failure of the structural connection. The groove is constructed and arranged to be operatively engaged by a pulling tool for removing the annular surface from engagement with the shaft.

While the pulley made in accordance with the principles of the aforesaid application disclosure is satisfactory, there is always the need to provide a pulley which is more cost effective. One way in which such cost effectiveness can be achieved is to provide a pulley which is lighter while maintaining the same or better performance level.

An object of the present invention is to fulfill the need expressed above. In accordance with the principles of the present invention, this objective is achieved by providing a drive assembly for rotating a shaft of a belt-driven device which comprises a hub in the form of an annular body of ferrous metal having a radially outwardly projecting annular portion, a pulley made of light weight non-ferrous metal, and a connecting ring of ferrous metal. The pulley has a web portion formed with an axially extending annular portion at a radially inward position thereon. The connecting ring is disposed in surrounding relation with the axially extending annular portion and has a connection therewith constructed and arranged to rigidify the connecting ring and the pulley. The hub has a connection with the connecting ring constructed and arranged to rigidify the hub with the pulley through the connecting ring. The web portion includes the annular extension thereof and the hub which has a bore therethrough defining a single machined annular shaft-engaging surface. The shaft-engaging surface is constructed and arranged to engage a periphery of the shaft in an interference-fitted manner so as to maintain torque transfer between the pulley and shaft in the event of the failure of either or both of the connections. The hub and the connecting ring are constructed and arranged with respect to the axially extending annular portion to provide an annular space adjacent the radially outwardly projecting annular portion of the hub of a size to allow a pulling tool to enter the annular space and act upon the radially outwardly projecting annular portion to remove the pulley from the periphery of the shaft.

Another object of the present invention is to provide a combination which includes the above-described drive assembly and a vehicle hydraulic power steering pump having a drive shaft wherein the single machined annular shaft-engaging surface is engaged with the periphery of the shaft in an interference-fitted fashion.

Another object of the present invention is the provision of a cost effective method of making a pulley. In accordance with the principles of the present invention, this objective is achieved by providing a method of making a pulley which comprises the steps of forming a pulley of lightweight non-ferrous metal having a web portion, forming a radially inward portion of said web portion into an axially extending annular portion, mounting a connecting ring of ferrous metal having an annular groove in an interior end surface thereof over the axially extending portion of the web portion so that a free end of the axially extending portion extends adjacent the annular groove, cold-forming the free end to fill the annular groove, welding a hub of ferrous material to the connecting ring, and machining a central axial bore through the web portion including the axially extending portion thereof and the hub.

These and other objects of the present invention will become more apparent during the course of the following detailed description and appended claims.

The invention may best be understood with reference to the accompanying drawings wherein an illustrative embodiment is shown.

DETAILED DESCRIPTION OF THE PRESENTLY PREFERRED EXEMPLARY EMBODIMENTS

Figure 1:
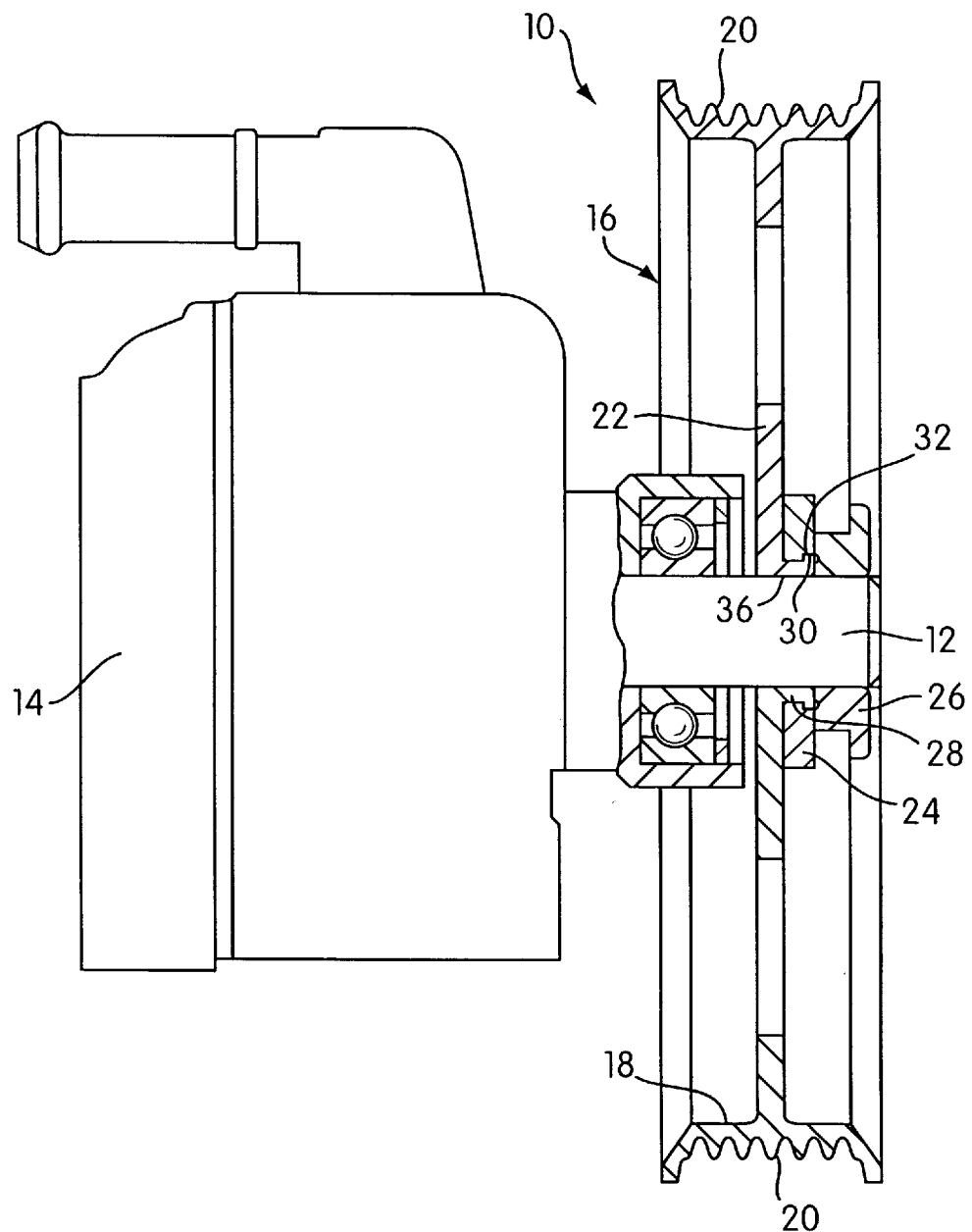
FIG. 1 is a view of a vehicle accessory and drive assembly combination, in partial section, provided in accordance with the principles of the present invention, shown with a hub and a portion of a pulley of the assembly press-fitted to a drive shaft.

Referring to the drawings, there is shown therein a drive assembly, generally indicated at 10, which embodies the principles of the present invention. It can be appreciated that the drive assembly 10 may be used to drive any shaft-driven device. However, in the preferred embodiment illustrated in FIG. 1, the drive assembly 10 is coupled to a drive shaft 12 of a vehicle accessory 14, such as a hydraulic steering pump, water pump, air injection pump or alternator. A hydraulic steering pump 14 is shown in FIG. 1.

With reference to FIG. 1, the drive assembly 10 includes a pulley, generally indicated at 16, which is made in any known fashion of a lightweight non-ferrous metal, as, for example, aluminum, magnesium or alloys thereof. The pulley 16 includes an outer annular section 18 providing an outer pulley surface 20 formed with a series of V-grooves constructed and arranged to cooperate with a poly-V belt of conventional design.

The pulley 16 also includes integral web portion 22 which, as shown, extends radially in central alignment with the exterior peripheral section 18. It will be understood that the web portion may be laterally offset in accordance with well-known practice.

The drive assembly 10 also includes a connecting ring 24 which is formed of a ferrous material as, for example, steel. A third component of the drive assembly 10 is a hub 26 in the form of an annular body of ferrous material as, for example, steel. Both the connecting ring 24 and the hub 26 can be formed in any known manner and preferably both are machined from bar stock although they may be forged.

Referring now more particularly to FIGS. 2–5, there is shown therein preferred steps in a method of making the drive assembly 10 in accordance with the principles of the present invention. It will be understood that, while the method to be described is preferred, in broadest aspects of the present invention, the drive assembly 10 can be made by other methods than the preferred method which is now to be described.

Figure 2:
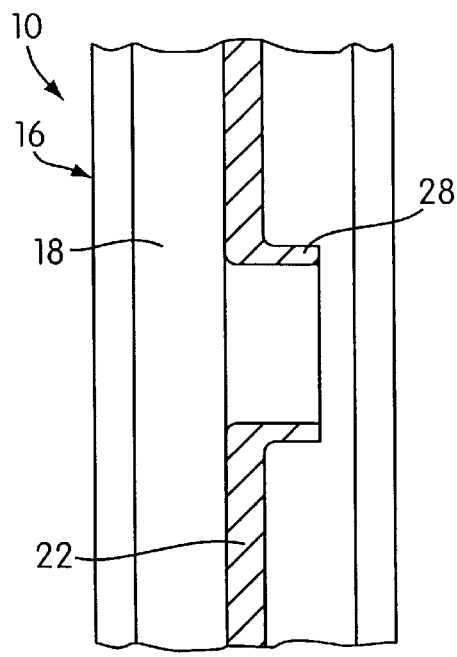
FIGS. 2–5 are fragmentary enlarged sectional views of the central portion of the drive assembly illustrated in FIG. 1, showing successive method steps in making the same in accordance with the principles of the present invention.
Figure 3:
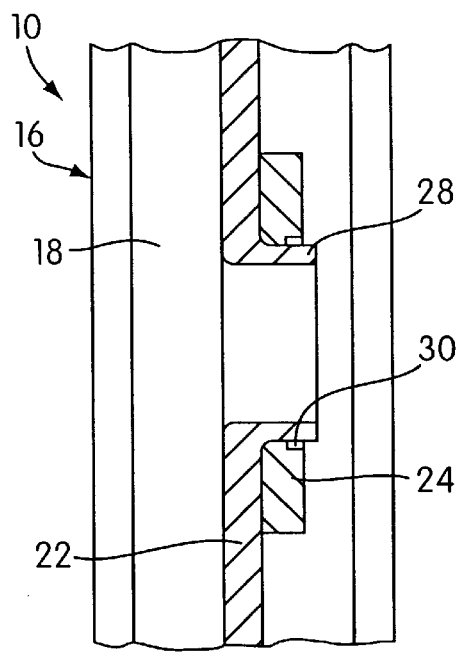

As best shown in FIG. 2, the web portion 22, at a position adjacent its radially innermost central portion, is cold-formed to provide an axially extending annular portion 28. A preferred cold-forming operation is to effect the step with cooperating dies. Next, as shown in FIG. 3, the connecting ring 24 is mounted over the axially extending portion 28 and is positioned in engagement with the web portion 22. As best shown in FIG. 3, the interior surface of the connecting ring is formed with an interior annular groove 30 which is disposed in spaced relation with the web portion 22, after the connecting ring 24 has been mounted on the axially extending annular portion 28. It will also be noted from FIG. 3 that a free end of the axially extending annular portion 28 is disposed adjacent the annular groove 30.

Figure 4:
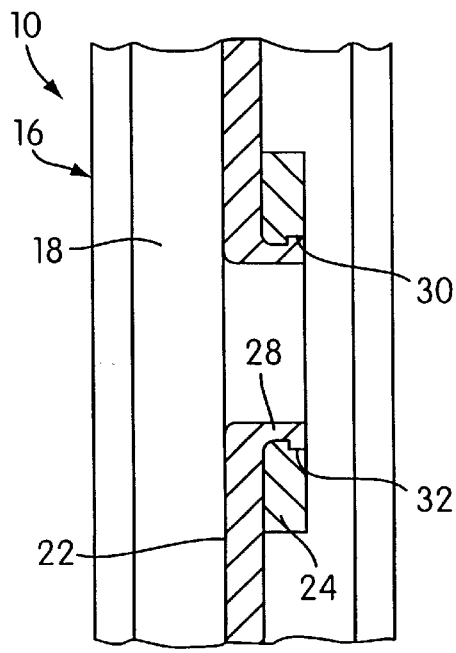

In the next step, the results of which are shown in FIG. 4, the free end of the axially extending annular portion 28 is cold-formed so as to fill the annular groove 30. This step results in the formation of an annular projection 32 on the exterior periphery of the axially extending annular portion 28 which is disposed within the annular groove 30. The engagement of the annular projection 32 within the annular groove 30 provides a mechanical connection which rigidifies the interconnection of the connecting ring with the web portion of the pulley.

Figure 5:
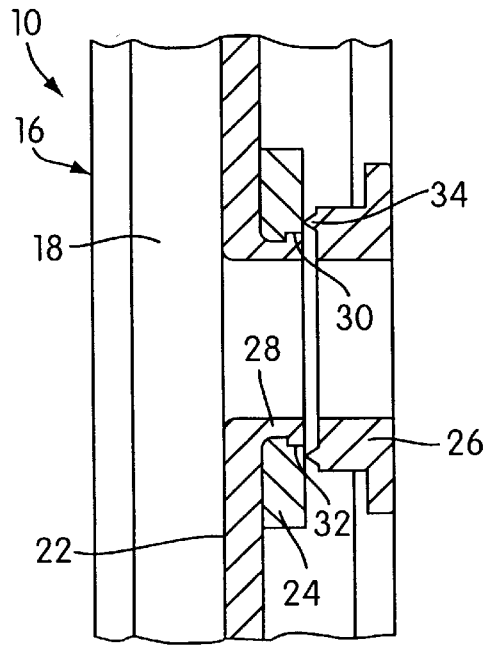

FIG. 5 shows the next step in the manufacture of the drive assembly 10 wherein the hub 26 is positioned in axially aligned relation with the connecting ring 24 and pulley 16. As shown in FIG. 5, preferably the hub 26 includes an axially facing annular bead 34 disposed in a position to engage an oppositely facing surface of the connecting ring 24 when the hub 26 and the pulley 10 are axially moved toward one another. Preferably, the hub and web portion are then pressed toward one another and a welding electrical charge is caused to flow therethrough which fuses the bead 34 to the connecting ring 24 and provides a welded connection between the hub 26 and the connecting ring 24 with the hub 26 disposed in engagement both with the connecting ring 24 and the adjacent end of the axially extending annular portion 28 of the pulley 16. In the broadest aspects of the present invention, other connecting modes between the hub and connecting ring may be utilized as well as other known modes of welding.

With the drive assembly 10 thus connected together, the hub 26 and web portion 22 including the axially extending annular portion 28 are machine-bored so as to provide a single machine interior shaft-engaging surface, as shown in FIG. 1. The machining of the shaft-engaging surface 36 is coordinated with the dimension of the periphery of the shaft 12 so that, when the drive assembly 10 is mounted on the shaft 12, the surface 36 is engaged with the periphery of the shaft 12 in an interference-fitted manner. This ensures that there will be a substantial area of contact between the drive assembly 10 and the shaft 12 with a significant amount of contact between the metal of the pulley 16 and the shaft 12 which ensures that, if the welded connection between the hub 26 and the connecting ring 24 or the connection between the connecting ring 24 and the axially extending annular portion 28 should fail or, if both should fail, there is still sufficient interengagement between the pulley 10 and the shaft 12 to maintain torque transfer.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method of making a pulley, comprising the steps of:
    forming, from a lightweight non-ferrous metal, a pulley member having an outer annular section and an inner web portion;
    forming a portion of said inner web portion into an axially extending annular portion;
    mounting a ferrous connecting ring having an annular groove in an interior end surface thereof over said axially extending portion, whereby said ferrous connecting ring surrounds said axially extending portion and a free end of said axially extending portion extends adjacent to said annular groove;
    cold-forming said free end, thereby filling said annular groove with material of said free end, and thereby mechanically joining said ferrous connecting ring to said pulley member;
    welding a ferrous hub to an axial end surface of said ferrous connecting ring; and
    machining a central axial bore through said inner web portion, said axially extending portion, and said ferrous hub.

2. The method as defined in claim 1, wherein said welding step includes electrically fusing an annular bead formed on an axial end surface of said ferrous hub with said axial end surface of said ferrous connecting ring.

* * * * *